Oct. 21, 1924.
E. HOPKINSON
1,512,096
PROCESS AND APPARATUS FOR MANUFACTURING WEFTLESS FABRIC
Filed Nov. 3, 1923  3 Sheets-Sheet 1
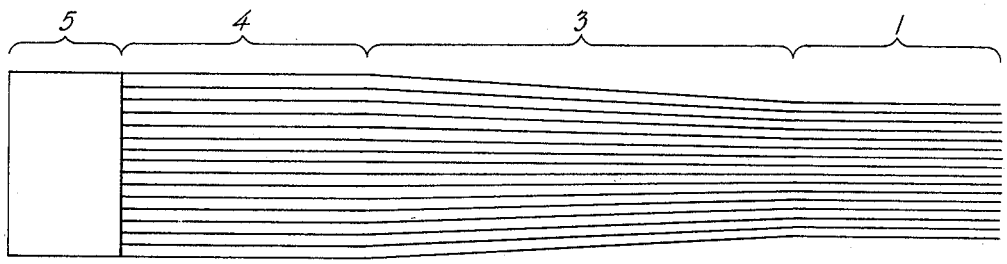
Fig. 1.
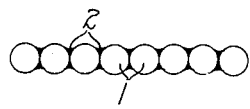  
Fig. 2.  Fig. 3.  Fig. 4.
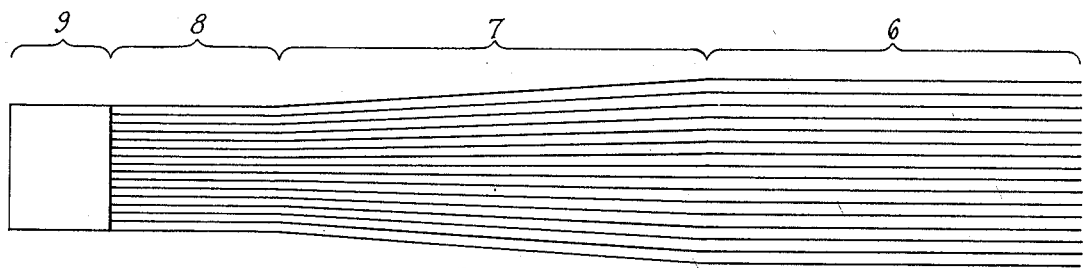
Fig. 5.
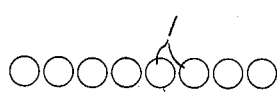 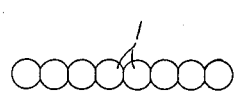 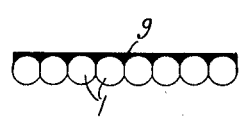
Fig. 6.  Fig. 7.  Fig. 8.
Fig. 9.
Inventor
ERNEST HOPKINSON
Attorney Oct. 21, 1924.  1,512,096
E. HOPKINSON
PROCESS AND APPARATUS FOR MANUFACTURING WEFTLESS FABRIC
Filed Nov. 3, 1923  3 Sheets-Sheet 2
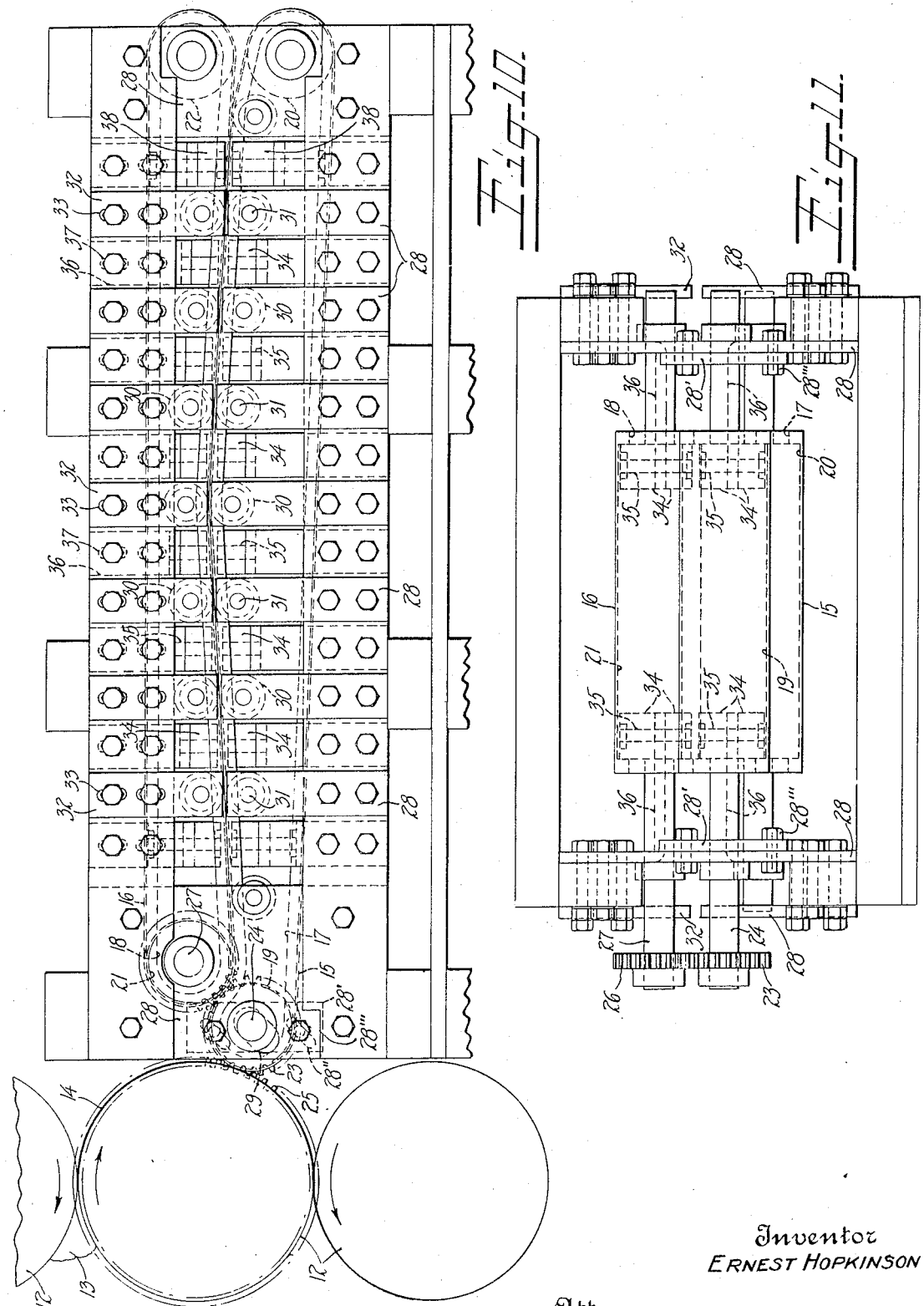
Inventor
ERNEST HOPKINSON
Attorney
Walter L. Pipes Oct. 21, 1924.
E. HOPKINSON
1,512,096
PROCESS AND APPARATUS FOR MANUFACTURING WEFTLESS FABRIC
Filed Nov. 3, 1923   3 Sheets-Sheet 3
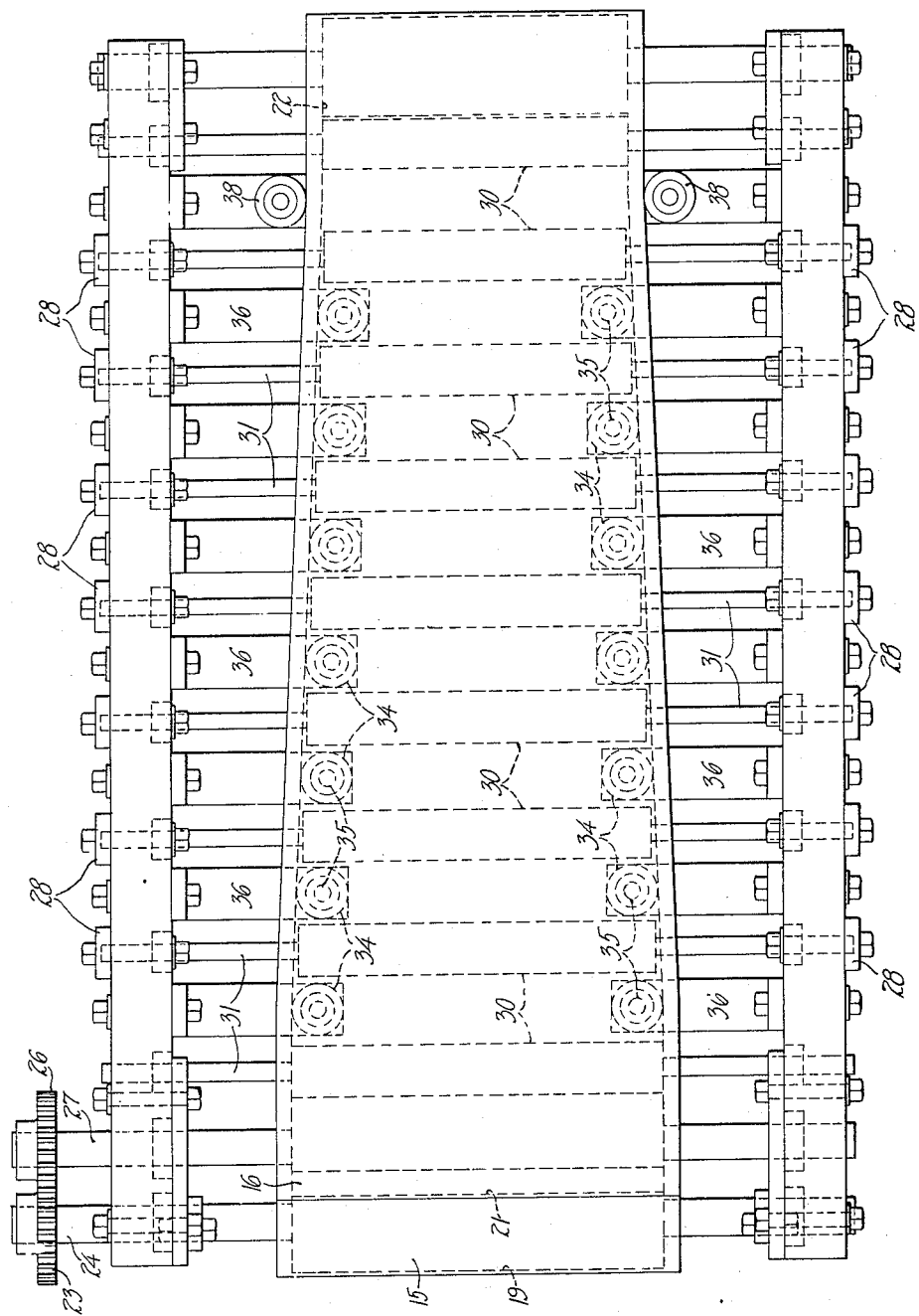
Fig.12
Fig.13
Inventor
ERNEST HOPKINSON
Attorney
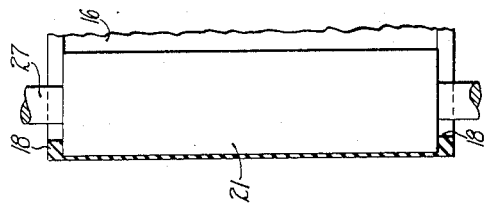

Patented Oct. 21, 1924.

1,512,096

UNITED STATES PATENT OFFICE.

ERNEST HOPKINSON, OF NEW YORK, N. Y.

PROCESS AND APPARATUS FOR MANUFACTURING WEFTLESS FABRIC.

Application filed November 3, 1923. Serial No. 672,504.

*To all whom it may concern:*

Be it known that I, ERNEST HOPKINSON, a citizen of the United States, and a resident of New York city, county of New York, and State of New York, have invented a certain new and useful Process and Apparatus for Manufacturing Weftless Fabric, of which the following is a full, clear, and exact description.

This invention relates to a process and apparatus for manufacturing weftless fabric. Broadly, it aims to provide a process and apparatus by which parallel cords in a layer or sheet may be shifted laterally to vary the distance between their centers and fixed in their altered relation or spacing. More narrowly, it aims to provide a process and apparatus by which parallel cords previously webbed together with rubber, or other similar material, may be located and fixed any desired distance between centers, either isolated from one another or crowded together so as to be a less distance between centers than the diameter of a single cord. It aims to provide a rapid, economical and reliable method of procedure, and a method enabling a previously webbed-together sheet of cords, denominated a "standard material," to be supplied to various factories and by them altered to give any desired spacing of the cords. The apparatus is simple, inexpensive and practical, and is adapted to be used in co-operation with existing equipment in factories. It enables cords to be variously spaced in a manner not practical heretofore for certain purposes. These are some of the objects of the invention, others will appear hereinafter.

With the illustrated embodiments in mind and without intention to limit more than is required by the prior art, the invention may be briefly stated to consist in, spreading or condensing a layer or sheet of cords, unconnected or connected together with rubber or similar material, in such a way as to vary the spacing of the parallel cords between centers, either increasing or decreasing the same, and then fixing the cords in their altered parallel relation. The fixing, preferably, but not necessarily, is accomplished by applying rubber composition to the altered sheet of cords or weftless fabric, as, for instance, by its immediate delivery from the space-changing device to a calender or pressing device. More definitely, and by way of illustration, a previously formed sheet of weftless fabric, having 26 cords to-the-inch, may be expanded so as to make the count 20 cords to-the-inch, or condensed so as to make the count 30 cords to-the-inch, and in either case skim-coated with rubber by a calender.

Embodiments of the invention are illustrated in the accompanying drawings in which:—

Figure 1 is a diagrammatic illustration of the process as employed for obtaining a greater spacing of parallel cords;

Figure 2 is a typical cross-section of weftless fabric before it is processed;

Figure 3 is a cross-section of the same after its cords have been more widely spaced apart;

Figure 4 is a cross-section of altered weftless fabric to which a coat of rubber or other material has been applied to hold the cords fixed in their altered relation;

Figure 5 is a diagrammatic illustration of the process as employed for condensing parallel cord material;

Figure 6 is a cross-section of unconnected cords in sheet formation, ready to be treated;

Figure 7 shows the same after they have been condensed or squeezed together;

Figure 8 is a similar cross-section after the condensed cords have been fixed in their altered relation with rubber;

Figure 9 is a cross-section and shows a coating of rubber or similar material to both surfaces of one form of the cord material;

Figures 10 and 11 are side and end elevations, respectively, of one form of apparatus for altering the relation or spacing of the cords in sheet formation, the former showing the appliance in co-operative relation with the calender;

Figure 12 is a plan view of the spacing appliance;

And Figure 13 is a cross-section of a single endless form of width-variable member or carrier.

According to the invention and generally, cords, which have been previously arranged in parallel relation, with or without uniting webs of rubber between them, are shifted laterally so as to either increase or decrease, as may be desired, the distance between their centers, and then treated so as to fix the cords in their altered relation. Their fixation in altered relation may be accomplished variously, but preferably by applying rubber thereto, as with a calender continuously forming more-or-less-warm rubber into a film and pressing the film onto and between the cords. For some purposes, however, either heating or pressure alone might be resorted to in order to fix the cords in altered relation, omitting or leaving, for a subsequent operation, the application of additional rubber.

Referring to the drawings, Figure 1, which is diagrammatic in character, shows a sheet of parallel cords 1 which have been previously arranged parallel in sheet formation in any suitable manner, either connected together with intervening webs of rubber 2, Figure 2, or unconnected, as shown in Figure 6, being laterally shifted or separated, as indicated at 3, to bring them into a more widely spaced relation, as indicated at 4, in which relation they may be fixed, as by the application of a coat of rubber, indicated at 5. Figures 2, 3 and 4 illustrate, on a large scale in cross-section, the relation of the cords at the different stages in the process indicated in Figure 1 at 1, 4 and 5, respectively.

In Figure 5, the process is diagrammatically illustrated as applied to the approaching or condensing of a sheet of parallel cords 1—which have been previously arranged in the parallel relation indicated at 6, in any suitable manner, preferably unconnected and independent of one another, as illustrated in Figure 6, and either slightly separated or in contact, as required,—these being laterally shifted toward each other, as illustrated at 7, to obtain a closer spacing of the cords, as indicated at 8, in which relation they may be fixed by the application of rubber 9. In Figures 6, 7 and 8, a fragment of the cord material is shown in cross-section on an enlarged scale at the different stages of the process indicated in Figure 5 by the numerals 6, 8 and 9, respectively.

Rubber, or similar plastic material, may be applied to one or both faces of the altered parallel cord material, as illustrated in Figures 4 and 9, of the drawings. The second coating may be applied either simultaneously with the first or at a subsequent time, as convenient, but preferably later.

The above generally outlines the process. For its performance, any convenient instrumentalities may be employed. One suitable type of apparatus is illustrated in Figures 10 to 13 of the drawings. The first-mentioned figure shows the preferred location of the spacing-appliance with respect to a calender of standard and well-known construction, comprising, essentially, a stack of rolls 12, between one pair of which a bank of rubber 13 may be continuously filmed, as at 14, and passed around to the bight between another pair thereof where the rubber is pressed to the altered cord material.

In front of and immediately adjacent the calender is located the spacing-appliance for changing the distance between centers of the parallel cords and either increasing or decreasing the same. The appliance is illustrated in the drawings as constructed and arranged to increase the spacing of the cords, but one skilled in the art will readily understand that the machine may be reversed or the parts may be re-arranged to effect the opposite result and decrease their spacing.

As illustrated for laterally shifting the cords in sheet formation further apart, the appliance comprises a pair of endless laterally stretchable members or belts 15 and 16, of substantially duplicate construction, their cross-section in a stretched condition being illustrated in Figure 13 of the drawings. Preferably, these are made entirely of vulcanized rubber without any reinforcing fabric or cords applied externally or incorporated internally of their body portion. But it is to be understood that any material, or combination of materials, may be employed for the endless members or belts provided that the belts or members are capable of being uniformly varied in width cross-wise. Inwardly directed flanges 17 and 18 are preferably provided on the margins of the belts, for a purpose later to appear, these flanges being reinforced, if desired.

The belts 15 and 16 are looped about end-rolls 19—20 and 21—22. The end-roll 19 of the lower belt is preferably located so as to press the belt more or less tightly against the intermediate calender roll, and the stretched weftless fabric or cord material with the cords in their altered relation firmly against the film of rubber 14 passing around the same. The cords fast to the rubber film 14 are passed in their changed spaced relation to the bight between the lower pair of calender rolls where the filmed rubber is pressed on and between them so as to permanently fix the cords in their altered relation. The lower belt 15 may be driven by contact or traction from the intermediate calender roll so that the film of rubber 14 and the cord material move at the same speed. But it is preferred, to attain the same end, to positively drive the end-roll 19, as with a gear 23 fast to its spindle or shaft 24, and meshing with another gear 25 on the intermediate calender roll. Another gear 26, set-screwed fast to the shaft 27 supporting the end-roll 21, may be intermeshed with and driven from gear 23, if desired. It will be understood, however, that any other suitable construction may be employed to drive the belts in any manner to effect even speed movement of the rubber film 14 and the cord material.

The spindles or shafts of the end-rolls 19—20 and 21—22, are journalled in any suitable form of frame, such as that indicated at 28. The shaft 24 of the end-roll 19 is preferably adjustably mounted in slots 29 provided in the frame generally indicated at 28, adjustment being afforded by a plate 28' provided with slots 28" receiving clamp-bolts 28'''. The endless belts 15 and 16 are arranged to contact for a portion of their paths and grip and hold the cord material so that the cords thereof will be shifted and displaced uniformly and progressively as the material is advanced. While effective gripping of the material may be accomplished variously, simple means are shown in the drawings in the form of opposed series of rolls 30, of substantially duplicate construction. These rolls 30 are of different lengths so as to engage the inner sides of the belts between the flanges 17 and 18 thereof. Their spindles 31 are journalled in the frame 28 and, preferably, but not necessarily, in such relation as to deflect the opposed portions of the endless belts, which are in contact, from a straight line. But this feature, while augmenting the grip on the cords, is a refinement and optional, at least in some cases. Desirably, adjustment is provided for varying the degree of the gripping action and, to this end, the frame-plates 32, in which the spindles 31 of the upper series of rolls are journalled, may be slotted, as indicated at 33.

While the endless belts 15 and 16 may be variously pulled upon to effect a progressive stretching or widening thereof, the simple means shown in the drawings for engaging the flanges 17 and 18 thereof are preferred. These comprise a series of disk-like rolls 34, freely rotatable on vertically arranged pins 35, that are secured to and supported by brackets 36, of angular form, which are bolted to the frame 28. And, for adjusting rolls 34 up and down, slots 37 may be provided in the brackets 36, if desired. Preferably, the disk-like rolls 34, nearest the calender, are arranged, as shown, so that the flanges 17 and 18 of the belts 15 and 16 move in parallelism, not convergently, to the end-rolls 19 and 21, the sides of which end-rolls said flanges engage. Likewise also, to control the flare or variation in width of the belts 15 and 16, other rolls 38, similar to those indicated at 34, are provided to engage the outside of the belt-flanges 17 and 18, near the receiving end of the appliance. To take up slack in the belts and (or) put them under suitable tension (lengthwise), the end-rolls 20 and 22 may be adjustably mounted in any convenient manner (not illustrated).

Cord material, introduced between the end-rolls 20 and 22, is gripped between the opposed contacting faces of the traveling endless members or belts with an intensity depending upon the curvature or deflection thereof from a straight line between their receiving and delivering ends, and also upon the adjustment of the opposed pairs of gripping rolls 30. As the cord material is moved along by the belts, the cord-elements thereof are separated (in the illustrated machine, but they may be approached) substantially uniformly and substantially equally on opposite sides of the center line of the cord material. The material, reaching the delivery end of the appliance, passes around the end-roll 19 and is pressed fast to the film of rubber 14 continuously formed on the calender roll, to which film it adheres and with which it travels to the bight between the lower pair of calender rolls where the rubber is pressed firmly to and around the cords more or less, depending upon their altered spacing and the presence or absence of initial uniting webs of rubber. A second film of rubber may be applied to the other side of the cords if and when desired.

It will be understood that any convenient apparatus other than that specifically disclosed may be employed for carrying on the process. For instance, the cords may have been previously arranged parallel on a liner or carrier of an elastic nature, bias fabric, knitted fabric, or a sheet of vulcanized rubber, and thus arranged, subjected to a more or less uniform stretching action by a "spreader" which is engaged with the elastic liner, the cords shifting as the foundation liner widens. And then, still on the elastic liner, and while the cords are in their altered spaced relation, delivered to a calender after the manner already disclosed and illustrated in Figure 10 of the drawings, care being taken to maintain the cords on the elastic liner in their altered stretched relation by, for instance, locating the "spreader" in immediate proximity to the calender. The "spreader" referred to above is a well-known device in the rubber art, many forms thereof being in use today for smoothing wrinkles out of fabric, old forms being shown in United States patents to Hawthorne, et al., No. 281,503, granted July 17th, 1883, and to Palmer No. 337,987, March 16th, 1886.

It will be understood that the invention is not intended to be limited to details excepting as hereinafter pointed out in the accompanying claims to which reference should be made for an understanding of the scope of the invention, which, as now understood, contemplates advancing parallel cords on a traveling support (endless or in lengths) which support is capable of being varied in width so as to uniformly alter the spacing of the cords thereon in combination with means for fixing the parallel cords in their altered spaced relation, such means being preferably rubber and applied by a calender. The apparatus may be used for any purpose and upon any materials, all within its capacity being comprehended. In the claims, the term "rubber" is employed to comprehend rubber in any form, crude or compounded to suit the articles into which the altered parallel cord material is to be manufactured.

The cord material supplied to the spacing-appliance may have been previously arranged in parallel relation in a layer or sheet in any suitable manner and at any suitable distance between centers. The individual cords may be bare, or rubberized with a film of rubber, solutioned rubber, or latex. If previously rubberized, the rubber may be applied so as to connect them with intervening joining webs (in the form known as "weftless fabric," disclosed in my prior Patent No. 1,424,020, granted July 25th, 1922), or without such connecting webs (as disclosed, for instance, in my prior application Serial No. 606,768, filed December 14th, 1922). Latex, with its water content, either natural, as obtained from the tree, or altered, and with or without compounding and vulcanizing ingredients, is the preferred form in which rubber is utilized. By the present invention a plurality of latex treated and dried cords in separate relation may be conducted through the dents of standard available combs at uniform distances apart and subsequently shifted towards one another any desired extent by the spacing-appliance disclosed, and then, fixed in their altered spaced parallel relation by a coat of rubber in a manner that permits of a very rapid rate of manipulation or production, desirable, of course, for economical reasons.

Having thus described my invention, what I claim and desire to protect by Letters Patent is:—

1. That continuous method of manufacturing weftless fabric which consists in, arranging cords parallel in sheet formation, laterally shifting the cords so as to vary their spacing, and applying rubber to the cords to hold them fixed in their changed relation substantially equal distances between centers.

2. That continuous method of manufacturing weftless fabric which consists in, arranging cords parallel in sheet formation, laterally and equally shifting the cords so as to vary their spacing, and calendering a film of rubber on the cords to hold them fixed in their changed relation substantially equal distances between centers.

3. That continuous method of manufacturing weftless fabric which consists in, uniformly varying the width of a previously made sheet of uniformly spaced parallel cords webbed together with rubber, and fixing the cords in their altered relation.

4. That continuous method of manufacturing weftless fabric which consists in, uniformly varying the width of a previously made sheet of uniformly spaced parallel cords webbed together with rubber, and applying rubber to the sheet to hold the cords in their altered relation.

5. That continuous method of manufacturing weftless fabric which consists in, varying the width of a uniform sheet of parallel cords webbed together with rubber equally on opposite sides of the center line of said sheet, and fixing the cords in their altered relation.

6. That continuous method of manufacturing weftless fabric which consists in, varying the width of a uniform sheet of parallel cords webbed together with rubber equally on opposite sides of the center line of said sheet, and applying rubber to the sheet of cords to hold them in their altered relation.

7. That continuous method of manufacturing weftless fabric which consists in, uniformly spreading a previously formed sheet of cords webbed together with rubber, and fixing the cords in their uniformly spread relation.

8. That continuous method of manufacturing weftless fabric which consists in, uniformly spreading a previously formed sheet of cords webbed together with rubber, and applying rubber to the cords to hold them in their spread relation.

9. That continuous method of manufacturing weftless fabric which consists in, laterally stretching a previously rubber-webbed-together sheet of parallel cords uniformly on opposite sides of its center, and fixing the cords in their altered relation.

10. That continuous method of manufacturing weftless fabric which consists in, laterally stretching a previously rubber-webbed-together sheet of parallel cords uniformly on opposite sides of its center, and applying rubber to the stretched sheet of cords to hold them fixed in their separated relation.

11. That continuous method of manufacturing weftless fabric which consists in, laterally shifting apart the cords in a sheet thereof which has been previously formed with rubber webs uniting the cords in parallel relation without disrupting the rubber webs, continuously filming rubber, and continuously pressing the filmed rubber to the laterally shifted cords to hold them fixed in their altered position substantially equal distances apart.

12. That continuous method of altering the spacing of cords in weftless fabric which consists in, laterally shifting the cords so as to vary their spacing, and fixing them in their shifted relation.

13. That continuous method of altering the spacing of cords in weftless fabric which consists in, laterally shifting the cords without disrupting the intervening rubber webs, and fixing them in their shifted position substantially equal distances between centers.

14. That continuous method of altering the spacing of cords in weftless fabric which consists in, laterally shifting the cords so as to vary their spacing, and applying rubber composition thereto so as to hold them in their shifted relation substantially equal distances between centers.

15. That continuous method of altering the spacing of cords in weftless fabric which consists in, laterally shifting the cords against the tension of their intermediate webs of rubber, and continuously applying more rubber to the cords so as to hold them in greater spaced relation substantially equal distances between centers.

16. An apparatus for altering the spacing of parallel cords in sheet formation comprising width variable means for holding the cords, means operating upon the width variable means to vary the spacing of the cords, in combination with, means for fixing the cords in their altered relation.

17. An apparatus for altering the spacing of parallel cords in sheet formation comprising width variable means for holding the cords, means operating upon the width variable means to vary the spacing of the cords, in combination with, means for applying rubber to the cords to hold them in their altered relation.

18. An apparatus for altering the spacing of parallel cords in sheet formation comprising a pair of endless laterally elastic gripping members, means for moving the same, and means for varying the width of the endless gripping members.

19. An apparatus for altering the spacing of parallel cords in sheet formation comprising a pair of endless laterally elastic gripping members, means for moving the same, means for guiding the endless gripping members in opposed relation so as to grip intervening cords or cord material, and means for varying the width of the endless gripping members and thereby the spacing of the cords held between them.

20. An apparatus for altering the spacing of cords in sheet formation comprising a pair of endless laterally elastic belts, means for supporting and guiding the same in opposed gripping relation upon intervening cord material, and means for uniformly varying the width of the opposed portions of the belts in the direction of their travel whereby to alter the spacing of intervening cord material.

21. The combination with means for continuously applying rubber composition, of a spreading device, and means for operating the spreading device at the same speed as the first-mentioned means, said spreading device having a member for engaging sheet material throughout the width thereof whereby said sheet material may be spread uniformly throughout its width.

22. The combination with a calender, of means for varying the distance between centers of cords in sheet formation, said means being positively driven to feed the material to the calender at a rate of speed equal to the peripheral velocity of its rolls.

23. The combination with a calender, of means for feeding cord material thereto at an even speed therewith, said last-named means including an endless laterally elastic member, and means for varying the width of said endless member.

24. The combination with a calender, of means for feeding cord material thereto at an even speed therewith, said last-named means including a pair of endless laterally elastic belts, means for guiding the same for a portion of their travel in opposed contacting relation, means for simultaneously varying the width of said belts at their opposed contacting portions, and means for moving the belts.

Signed at New York city, county of New York, and State of New York, this 2nd day of November, 1923.

ERNEST HOPKINSON.